United States Patent [19]

Budzich

[11] Patent Number: 4,687,572

[45] Date of Patent: Aug. 18, 1987

[54] WATER-OIL SEPARATING SYSTEM INCLUDING CENTRIFUGAL TYPE SEPARATOR AND FLOW CONTROLS THEREFOR

[75] Inventor: Tadeusz Budzich, Moreland Hills, Ohio

[73] Assignee: Fluid Power Components, Inc., Cleveland, Ohio

[21] Appl. No.: 854,169

[22] Filed: Apr. 21, 1986

Related U.S. Application Data

[63] Continuation-in-part of Ser. No. 746,132, Jun. 18, 1985, Pat. No. 4,591,433, which is a continuation-in-part of Ser. No. 629,907, Jul. 11, 1984, Pat. No. 4,534,860.

[51] Int. Cl.[4] .................... B01D 33/04

[52] U.S. Cl. .................... 210/114; 210/115; 210/126; 210/128; 210/137; 210/143; 210/167; 210/354; 210/377

[58] Field of Search .................... 210/104, 114–116, 210/121, 123, 126, 128, 137, 143, 167, 182, 187, 259, 354, 360.1, 377, 380.1, 787; 494/35, 36, 49, 901

[56] References Cited

U.S. PATENT DOCUMENTS

| | | | |
|---|---|---|---|
| 1,722,160 | 7/1929 | Smith | 210/116 X |
| 2,723,079 | 11/1955 | Fulton et al. | 494/49 X |
| 2,755,992 | 7/1956 | Tait et al. | 494/49 |
| 2,792,172 | 5/1957 | Tait | 210/167 X |
| 3,140,257 | 7/1964 | Wilder, Jr. et al. | 210/114 X |
| 3,189,180 | 6/1965 | Scott et al. | 210/259 X |
| 3,269,155 | 8/1966 | Shaw | 210/121 X |
| 3,368,681 | 2/1968 | Kasten | 210/114 |
| 3,375,928 | 4/1968 | Chase | 210/114 X |
| 3,443,692 | 5/1969 | Halsey | 210/114 X |
| 3,623,657 | 11/1971 | Trump | 210/104 X |
| 3,784,092 | 1/1974 | Gibson | 494/49 X |
| 4,046,315 | 9/1977 | Klingenberg et al. | 494/36 X |
| 4,054,519 | 10/1977 | Tufts | 210/104 |
| 4,081,373 | 3/1978 | Roznìecki | 210/114 |
| 4,165,032 | 8/1979 | Klingenberg | 494/49 |
| 4,221,323 | 9/1980 | Courtot | 494/49 X |
| 4,230,581 | 10/1980 | Beazley | 494/49 X |
| 4,264,442 | 4/1981 | Jackson | 210/114 X |
| 4,406,651 | 9/1983 | Dudrey et al. | 210/377 X |
| 4,431,540 | 2/1984 | Budzich | 210/360.1 |
| 4,492,631 | 1/1985 | Martin | 210/354 X |

*Primary Examiner*—Robert Spitzer
*Attorney, Agent, or Firm*—Baldwin, Egan & Fetzer

[57] ABSTRACT

A centrifugal filter separator system operable to separate from oil under pressure, contaminants and water. The centrifuged water port of the centrifugal filter separator of the system is coupled to a differential pressure responsive, sensor control, which automatically senses the presence of a layer of centrifuged water against the internal surface of the rotating drum of the centrifugal separator. The sensor control is coupled to a flow control circuit which in conjunction with the differential pressure sensor control causes automatic removal of an existing layer of centrifuged water from the rotating drum via the water exit port of the separator. When there is no adequate depth layer of centrifuged water on the inner surface of the rotating drum, the sensor control deactivates the water removal circuit, while the flow control circuit maintains a minimum generally constant flow of liquid from the water port of the separator for priming purposes. The flow control circuit is coupled to a pressurized gravity type separator in the system from which separated oil is returned back to the centrifugal filter separator. The gravity separator includes an inverse relief valve circuit for replenishing water evacuated from the gravity separator, with oil from the pressure port of the system pump.

15 Claims, 3 Drawing Figures

Fig I

WATER-OIL SEPARATING SYSTEM INCLUDING CENTRIFUGAL TYPE SEPARATOR AND FLOW CONTROLS THEREFOR

This is a continuation-in-part patent application of applicant's copending U.S. patent application Ser. No. 746,132 (now U.S. Pat. No. 4,591,433 dated May 27, 1986), filed June 18, 1985 and entitled "Automatic Controls of Water-Oil Separating System For Use With Centrifugal Type Separator", which in turn is a continuation-in-part application of U.S. Ser. No. 629,907, filed July 11, 1984 (now U.S. Pat. No. 4,534,860 issued Aug. 13, 1985) and entitled "Water-Oil Separating System For Use With Centrifugal Type Separator".

This application relates in general to a centrifugal filter separator system operable for separating oil under pressure from contaminants and water, and more particularly to a separator system which includes a differential pressure responsive sensor control automatically sensing the presence of a layer of centrifuged water against the internal surface of the rotating drum of the centrifugal type separator, and with such sensor control being coupled to a flow control circuit which in conjunction with the sensor control, causes automatic removal of the layer of centrifuged water from the rotating drum via the water exit port of the centrifugal separator. However, when there is no adequate depth layer of centrifuged water existing on the inner surface of the rotating drum, the sensor control deactivates the water removal circuit of the separator while the flow control circuit maintains a minimum constant flow of liquid from the water port of the separator, for priming purposes.

BACKGROUND OF THE INVENTION

Centrifugal oil filters utilizing a rotating drum and powered by the reaction of oil jets are well known in the art.

Applicant's U.S. Pat. No. 4,431,540 dated Feb. 14, 1984 and entitled "Centrifugal Filter Separator" and U.S. Pat. No. 4,534,860 dated Aug. 13, 1985 and entitled "Water-Oil Separating System For Use With Centrifugal Type Separator" disclose applicant's centrifugal filter separator and its operating method, and also disclose a pressurized gravity type separator in generally similar form, as that utilized in the present system.

Applicant's aforementioned copending U.S. patent application Ser. No. 746,132 discloses a centrifugal type filter system having a gravity type separator with means automatically responsive to the water level in the separator for generating a signal for automatic evacuation of water from the gravity separator, generally similar to that utilized in the present system, and the teachings in such prior patents and pending patent application and the references cited therein may be reviewed for a better understanding of the background of the present invention.

SUMMARY OF THE INVENTION

The present invention provides a centrifugal type of filter separator system which includes a differential pressure responsive sensor control, which automatically senses the presence of a predetermined depth layer of centrifuged water against the internal surface of the rotating drum of the centrifugal type separator of the system, with the sensor control being coupled to a flow control circuit which in conjunction with the differential pressure sensor control, causes automatic removal of the layer of centrifuged water from the rotating drum via the water exit port of the centrifugal separator. However, when there is not adequate depth layer of centrifuged water existing on the inner surface of the rotating drum, the sensor control automatically deactivates the water removal circuit, while the flow control circuit maintains a minimum generally constant flow of liquid from the water port of the separator for priming purposes. The flow control circuit is coupled to a pressurized gravity type separator in the system from which the separated oil is returned back to the centrifugal filter separator.

Accordingly, it is an object of the invention to provide a centrifuged water extraction system which includes sensor means for automatically sensing the presence of a predetermined depth layer of centrifuged water against the internal surface of the rotating drum of the centrifugal type separator, together with flow control means responsive to the sensor means operable to induce flow in the water removal circuit of the centrifugal separator as long as there is a layer of water maintained against the inner surface by centrifugal force during rotation of the drum of the separator.

Another object of the invention is to provide a system of the latter described type which is coupled to a gravity type separator from which oil is returned back to the centrifugal separator.

A still further object of the invention is to provide a system of the aforementioned type wherein the sensor means includes means responsive to a pressure differential between the pressure at the inlet port of the centrifugal type separator and the pressure at the water exit port of the separator during operation of the system.

A still further object of the invention is to provide a system of the aforementioned type wherein the flow control circuit includes a flow resistance means coupled downstream from the sensor and liquid throttling means operable to maintain a relatively constant low pressure differential across the flow resistance means.

A still further object of the invention is to provide a system of the aforementioned type wherein the flow control circuit includes a leakage mechanism upstream of the sensor device, together with liquid throttling means operable to maintain by liquid throttling a relatively constant low pressure differential across the leakage mechanism.

A still further object of the invention is to provide a system of the aforementioned type wherein the gravity separator includes an inverse relief valve circuit for replenishing water evacuated from the gravity separator with oil from the pressure port of the pump of the system.

Other objects and advantages of the invention will be apparent from the following description taken in conjunction with the accompanying drawings wherein:

DESCRIPTION OF PREFERRED EMBODIMENT AND ALTERNATE EMBODIMENTS

Figure 1:
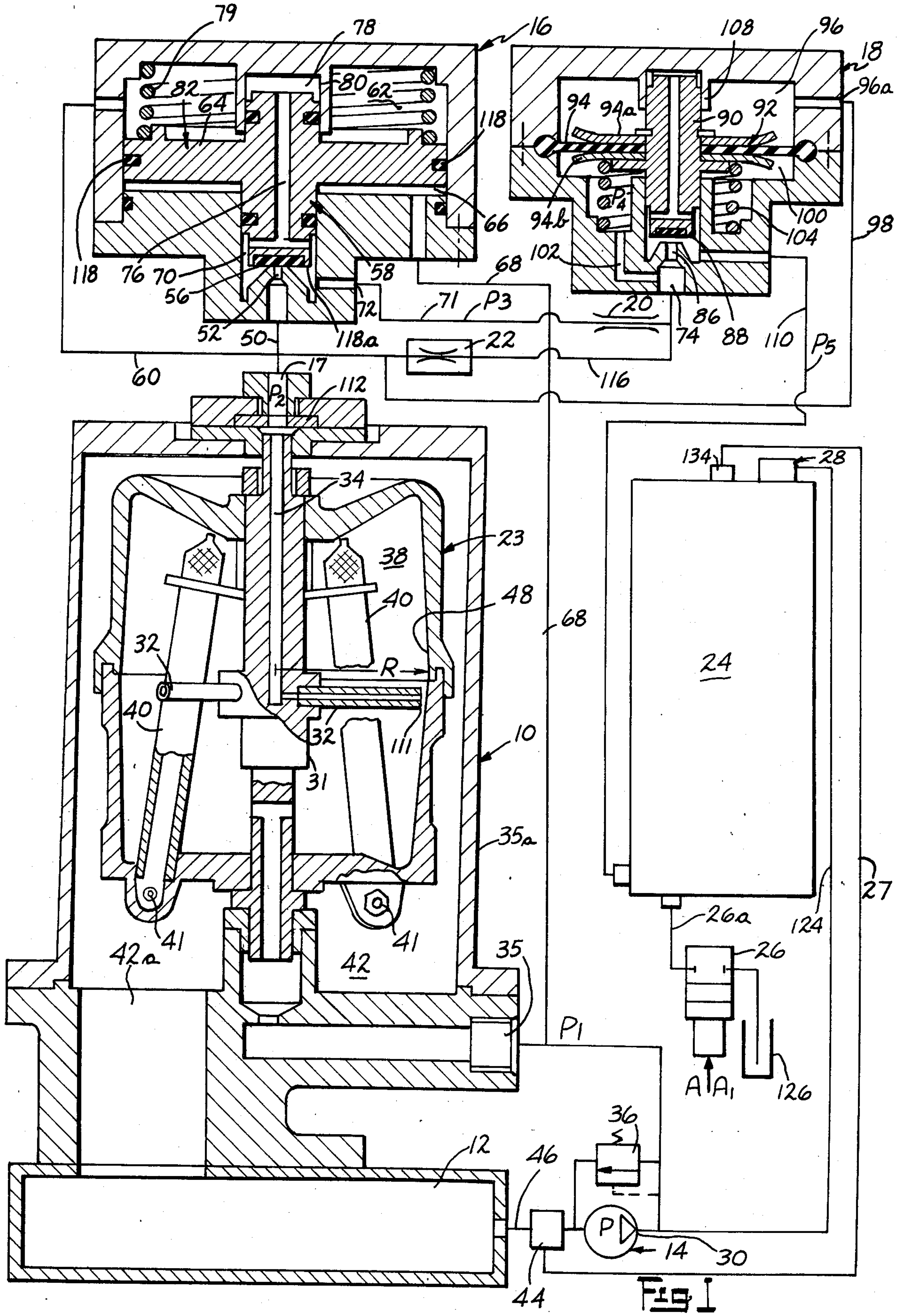
FIG. 1 is a sectional, generally diagrammatic illustration of the centrifugal type filter separtor system with various components of the system being shown schematically.

Referring now in particular to FIG. 1, the centrifugal filter separator system illustrated comprises a centrifugal type filter separator 10, a system reservoir 12, a pump 14 for supplying pressurized oil, a differential pressure responsive sensor control 16 coupled to the centrifuged water exit port 17 of the centrifugal separator 10, a flow control circuit including a flow control valve 18, a flow orifice 20, and a leakage orifice 22 operatively coupled to the sensor control 16, for automatically sensing the presence of a layer of centrifuged water against the internal surface of the rotating drum of drum assembly 23 of the centrifugal type separator, and causing automatic removal of the layer of centrifuged water from the rotating drum via the water exit port of the separator.

The flow control valve 18 is coupled to a pressurized gravity type separator 24 which is schematically shown, and which includes in the embodiment illustrated, a solenoid valve 26 coupled thereto by flow line 26a and adapted for actuation by an applied signal, for evacuating separated water from the gravity type separator, with the separated oil from the separator being returned back via flow line 27 to the pump 14 and thus to the centrifugal type separator.

The separator 24 in the embodiment illustrated includes an inverse relief valve means 28 for replenishing water evacuated from the gravity separator, with oil from the pressure port 30 of the pump 14 of the system.

The structure of the centrifugal type separator 10 and its operation is described in detail in aforementioned U.S. Pat. No. 4,431,540 and is also shown and described in aforementioned U.S. Pat. No. 4,534,860, and in the aforementioned U.S. patent application Ser. No. 746,132 (now U.S. Pat. No. 4,591,433), with such patents and patent application being incorporated herein by reference for a detailed disclosure of the same. Suffice it to say that the centrifugal type separator 10 includes a vertical shaft assembly 31 provided with water extraction means including water extraction tubes 32 which communicate with internal passage 34 in the shaft assembly 31.

The centrifugal separator 10 is adapted to be supplied via inlet port 35 in housing 35*a* with pressurized oil and water from pump 14, which is provided with a conventional relief valve 36. The pressurized oil from internal space 38 of the rotatable drum assembly 23 is conducted through the inlet tubes 40 provided with strainers, to the reaction jet nozzles 41 which communicate directly with the internal space 42 of the housing, which is connected by oil outlet 42*a* with the reservoir 12.

The stationary housing 35*a* of the centrifugal separator has as aforementioned, inlet port 35 connected to the pressure port 30 of the pump 14, with the suction port of the pump being connected to the reservoir 12 via the oil injection fitting 44 and flow line 46. Housing 35*a* includes the aforementioned clean oil outlet port 42*a* connected to the reservoir 12, and centrifuged water exit port 17 which is adapted to coact with the shaft assembly 31 in transmitting the centrifuged water from the inner surface 48 of the rotating drum to the exterior of the centrifugal separator 10.

The centrifuged water port 17 of the centrifugal separator 10 is coupled via flow line 50 to metering orifice 52 of differential pressure responsive sensor control 16. Thus, P2 pressure at water exit port 17 is transmitted from the port 17 of the centrifugal separator 10 to the metering orifice 52 which is adapted to be blocked by elastomer seat 56 located on the frontal area of throttling piston 58 of the sensor. The liquid at P2 pressure is also transmitted via flow line 60 to space 62 above the piston 64 of the sensing control 16. Space 66 at the bottom of the piston 64 of sensor 16 is connected through flow line 68 with the centrifugal separator inlet port 35 and therefore is subjected to the P1 pressure at the inlet port.

The pressure existing in space 70 of the sensor control 16 is the same as the pressure existing in flow line 71 running from port 72 in sensor 16 to the port 74 in the flow control member 18. The pressure in space 70 and in line 71 is determined by the control action of the flow control valve 18, and is designated in the FIG. 1 drawing as P3 pressure.

P3 liquid pressure in space 70 of control 16 is transmitted through the balancing passage 76 in piston 58 to the space 78 in the sensor control 16. Thus in a well known manner and due to the action of the balancing cylinder 80 of the sensor control 16, the throttling piston 58 of the control is in a state of force equilibrium, being independent of the magnitude of the P3 pressure. Accordingly, the piston 64 and associated throttling piston 58 of sensor 16 is subjected to the pressure differential between the P1 and P2 pressures on the unbalanced annular area of the piston 64, generating a force which is opposed by the biasing force of its spring 79.

Therefore a certain specific pressure differential is generated during rotation of drum assembly 23 due to the presence of water in the radial tubes 32 of the water evacuation circuit of the centrifugal separator.

This differential pressure causes the differential piston assembly of control 16 (designated by reference number 82) to move upwardly, thereby moving the elastomeric seat 56 off the metering orifice 52 and connecting the space 70 with the metering orifice 52, thus establishing communication between the passageway 34 in the shaft assembly 31 (which is part of the water extraction circuit of the centrifugal separator) with flow line 71 which is connected as aforementioned to the flow control valve 18.

Only minimal throttling action will generally take place at the created gap between the seat 56 and the metering orifice 52 and therefore the P3 pressure will approximately equal the P2 pressure. The effective area of metering orifice 52 is insignificant when compared to the area of the piston 64, and therefore will have a negligible effect on the operation of the water detecting sensor control 16. Also, because of the balancing feature of the throttling piston 58, the effect of the downstream P3 pressure on the operation of the sensor control 16 is eliminated.

Conduit line 71 at P3 pressure is connected through the aforementioned flow orifice 20 to inlet port 74 and thence to metering orifice 86 in flow control valve 18. Metering orifice 86 is adapted to work in cooperation with the elastomer seat 88 on throttling piston 90 of the throttling control assembly 92 of valve 18. Throttling control assembly 92 includes diaphragm 94 and diaphragm supporting plates 94*a* and 94*b*.

Space 96 in the flow control valve 18 is connected via port 96*a* and flow line 98 back to flow lines 50 and 60, and therefore is subjected to the P2 pressure at the centrifuged water exit port 17, which P2 pressure reacts on the effective area of the throttling control assembly 92.

Space 100 in the flow control valve 18 is subjected to P4 pressure and is connected through passageway 102 to inlet port 74 of the flow control valve 18. Therefore, the throttling control assembly 92 is subjected to the pressure differential between the P2 and the P4 pressures acting on its effective area and to the biasing force of its coacting spring 104. It will be noted that the effect of the P4 pressure on the cross sectional area of the throttling piston 90 may be completely balanced by the balancing cylinder 108, to eliminate any effects of downstream P5 pressure in flow line 110.

Accordingly, the flow control valve 18 by the throttling action between the metering orifice 86 in the valve and the elastomer seat 88 on the piston 90 of the balancing cylinder 108 will maintain a constant pressure diferential across the flow orifice 20, and therefore will maintain the constant pressure differential between the P2 or P3 and P4 pressures which is a function of the effective area of the throttling control assembly 92 and the biasing force of the associated spring 104. The flow control valve 18 because of minimal friction losses (the only movement being that of the throttling piston 90) and the relatively large effective area of the diaphragm 94, can operate with small pressure differentials of only a few p.s.i. These low pressure differentials permit at comparatively low flow levels, a selection of flow orifice 20 which is insensitive to silting and is contamination tolerant. It will be noted that flow through flow orifice 20 can occur only with the water detecting sensor 16 being activated by the presence of a layer of water on the interior surface 48 of the rotating drum assembly 23, with the open ends of the water extraction tubes 32 being submerged in such layer of water.

The rationale for this is that the liquid contained within the radial tubes 32 of the water extraction circuit of the centrifugal separator 10 rotate with the drum and thus this liquid in the tubes is subjected to centrifugal forces which are able to be translated into equivalent pressures.

Any water mixed with the oil supplied to the inlet port 35 of the centrifugal separator is centrifuged within the rotating drum of the separator, at the inner surface of the drum and forms a water cylinder which rotates with the drum in a known manner and as described in the aforementioned background patents, the thickness or depth of the water cylinder varying with the quantity of water that has been centrifuged from the oil-water mixture.

If the distal end 111 of each extraction tube 32 is immersed in this cylinder of water and if a certain leakage from the center passageway 34 of the shaft assembly 31 takes place, the water is displaced and enters the water extraction tube, passing from passageway 34 to the centrifuged water exit port 17 of the centrifugal separator. In this connection, it will be understood that in the working condition of the centrifugal separator, the upper end of the shaft assembly 31 is moved vertically into sealing engagement with the confronting surface of the thrust washer 112 of the separator assembly, and in a manner known in the art.

Since the extractor tubes 32 full of water (which has a higher density than oil) generates a higher pressure, there will automatically exist a pressure differential between the pressure in the liquid at the inner surface 48 of the rotating drum of the separator and the pressure within the central passageway 34 of the shaft assembly 31. This pressure differential will be proportional to the difference in specific gravity between water and oil, and the square of the r.p.m. (revolutions per minute) of the drum. The value of the drum radius R which is a square function, may and should only be considered if the extractor tubes are only partially filled with water.

The rotating drum rotates at a selected specific velocity which may be and preferably is within the range of about 5,000 r.p.m. If it is assumed that the difference between specific gravity of water and oil is 0.2, this in practical units equals 0.0072 pounds per cubic inch. In practical experiments, this differential pressure within the extractor tubes full of water equals approximately 12 pounds per square inch.

Since the centrifugal separator inlet port 35 is adapted to be maintained at approximately 60 pounds per square inch pressure, the pressure within the passageway 34 of the shaft assembly 31 will be approximately 48 pounds per square inch. However, if the extractor tubes are only partially filled with water, the pressure differentials will of course be less.

When water is being extracted by the centrifugal separator, due to flow resistance through the relatively small internal diameter tubes 32, the pressure differential will increase providing a snowballing effect. Therefore, in order to use this pressure differential as an indication of the presence of water, the pressure drop due to flow should not exceed, say approximately 20% of the pressure drop due to gravity. Accordingly, to use this pressure differential in the water removal circuit as an indication of the presence of a layer of centrifuged water on the internal surface of the rotating drum and also as a parameter in operation of the sensor control 16, the maximum flow through the water extracting tubes 32 must be limited to limit the flow resistance. That is the reason why the diaphragm operated flow control valve 18 is downstream of the differential pressure responsive sensor control 16.

In the present arrangement since the area of the diaphragm 94 of the flow control valve 18 is relatively large, flow through the leakage orifice 22 can occur at differential pressures equivalent to a relatively few p.s.i., such as for instance, differential pressures within the range of ½ pound per square inch up to a maximum of say for instance 2 pounds per square inch, permitting small flow with a comparatively large, nonsilting flow passage through orifice 22.

With no water layer present at the inner surface of the rotating drum assembly, the water detecting sensor 16 isolates the flow control orifice 20 from the water extraction circuit of the centrifugal separator 10, due to the fact that there will be no differential pressure in the extraction circuit, and therefore the elastomer seat 56 will engage the throttling orifice 52 of sensor 16.

However, wtih said no water existing condition, the flow control valve 18 will still generate a leakage liquid flow of oil through the leakage orifice 22 at the pressure differential of the flow control valve 18, which is constant and depends on the preload of its associated spring 104. Such preload may be, as an example, approximately six pounds. Under these conditions, the flow control valve 18 performs a function of maintaining a constant pressure differential across the leakage orifice 22 and therefore maintains a constant flow at a minimum preselected level through the leakage orifice 22, for establishing a priming action for the introduction of water from the inner surface 48 into the radial, water extracting tubes 32. As can be seen, the leakage control orifice 22 is connected to flow control valve 18 by a flow line 116, and directly to the control passageway 34 of the shaft assembly 31, and just downstream of centrifuged water exit port 17 of the centrifugal separator.

With the space 70 in the water detecting sensor 16 isolated from the centrifuged water exit port 17 due to the engagement of the elastomer seat 56 with metering orifice 52, the flow control valve 18 will automatically maintain, as aforedescribed, a constant pressure differential across the leakage orifice 22 which as previously mentioned can be selected as low as a few p.s.i. Therefore, by its throttling action, the flow control valve 18 with the water extraction circuit deactivated, will maintain a constant pressure differential and therefore constant flow at a minimum preselected level through the leakage orifice 22. It will be seen as aforementioned that this minimum constant flow which is independent of the action of the sensor control 16, is used for priming action to cause the introduction of water from the inner surface 48 of the rotating drum into the tubes 32 of the water extraction circuit.

Moreover, with the water detecting control 16 activated by a layer of centrifuged water on the inner surface of the rotating drum of the centrifugal separator, the flow control valve 18 maintains a constant pressure differential both across leakage orifice 22 and flow orifice 20, and therefore maintains a certain constant flow from the water extraction circuit. This controlled flow is selected at such a level that the resistance caused by this flow in the water extraction circuit and specifically in the radial tubes 32, represents only a certain small amount of the pressure differential developed across the piston 64 of the sensor 16, due to the centrifugal pressures compensating in a way for the flow resistance of the action of the water detecting control 16 while in the process of extracting water.

The area of piston 64 of the differential sensor control 16 for detecting the presence of water, is made sufficiently large so that the actuating force, say for instance 5 p.s.i. $\Delta P$ is quite large, and dictates the size of the associated compression spring 78, the friction factor of the seals 118 on the piston being insignificant. It will be noted that the frontal area 118*a* of the throttling piston 58 of the sensor 16 is completely balanced by the balancing cylinder 80 connected by the balancing passage 76 therethrough. Therefore, this differential sensor control 16 is essentially an on/off device with a minimal amount of throttling of the liquid from the water extraction circuit of the centrifugal separator.

The throttling to maintain a very small constant pressure differential takes place in the diaphragm type flow control valve 18, and again, due to the balancing nature of the balancing cylinder 108 thereof, such throttling is not only relatively independent of the upstream pressure but also of the downstream pressure at the control 16 and of the downstream pressure in the associated flow line 110.

The induced leakage through the leakage orifice 22 is directed via flow control valve 18 and the gravity separator 24 to the inlet of the oil injection fitting 44 in circuit with the centrifugal separator 10, and therefore any water within the leakage flow is not introduced into the system oil reservoir 12.

It will be understood therefore, that with the water sensing control 16 not active, indicating the absence of water in the rotating drum of the centrifugal separator, the flow control 18 maintains a constant pressure differential across the leakage orifice 22 and therefore maintains a constant flow across the leakage orifice at a minimum level, in order to prime the radial tubes 32 of the water extractor circuit of the centrifugal separator once the centrifugal filter separator starts centrifuging water. This priming flow is maintained, due to a very low pressure differential, at minimum level while the leakage orifice 22 will be contamination tolerant. This priming flow of oil in stand-by condition, with the oil substantially free of water, is passed through the pressurized gravity type separator 24 via flow line 110. The action of gravity separator 24 was described in general in aforementioned U.S. Pat. No. 4,534,860 and in the aforementiond pending patent application Ser. No. 746,132.

However, in such gravity separator arrangements of U.S. Pat. No. 4,534,860 and pending application Ser. No. 746,132 (now U.S. Pat. No. 4,591,433), a continuous flow of liquid at a comparatively high level is always passed through the water extraction circuit, the flow level being determined by the viscosity of the liquid and the setting of the pressure relief valve of the gravity separator. In such prior arrangements, the constant flow at a comparatively high level takes place irrespective of whether the centrifugal separator is centrifuging water or not. Therefore, a substantial flow of oil at least equal to the maximum water extraction capacity of the system, is circulated through these prior separator systems and back to the system pump, and introduced to the pump inlet through the injection fitting 44.

In the present arrangement, in the absence of water at the inner surface of the rotating drum, continuous flow through the separator system which is now only necessary to prime the tubes 32 of the water extraction circuit, can be reduced by a factor of more than 100 to 1. This substantially improves the efficiency of the gravity separator. The water extraction circuit of this centrifugal separator system extracts water only when it is centrifuged, with a minimum amount thereof entrained in the oil, greatly increasing the efficiency of the gravity separator 24, since the flows through the gravity separator are not only greatly reduced, but the percentage of water in the extracted liquid from the centrifugal separator is much greater in turn favorably influencing the efficiency of the separation.

It should be noted that the principle of operation using a diaphragm type control is equally applicable to the design of the water sensor control 16 as it is to flow control 18, which control 16 is of an essentially non-throttling type control and not subjected to high forces.

The leakage orifice 22 and the flow orifice 20 can be of either a sharp edge orifice type (and therefore relatively independent of the viscosity effect of the liquid) or can include a viscous resistance, usually in the form of a length of tubing. It is preferably, from the standpoint of operation of the flow orifice control, to keep the viscosity effect on the flow characteristics of the orifice 26 comparatively small, so that the flow of liquid will not change significantly with the liquid viscosity, which, due to the fact that the liquid is a mixture of oil and water, is an unknown factor and may vary widely.

The leakage orifice 22 operates mainly, while passing generally pure oil when the sensing control 16 is not active. It is therefore preferable to make the leakage orifice 22 viscosity sensitive to minimize the flow of liquid for priming purposes. This viscous effect may include a small length of tubing, which will make the flow therethrough, in a known manner, sensitive to viscosity.

The pressure level in the gravity separator 24 is maintained at a certain constant preselected level, as dictated by the setting of the outlet pressure relief valve assembly 134. This setting is preferably selected in such a way that only a minimum of throttling action in flow control valve 18 takes place.

Figure 2:
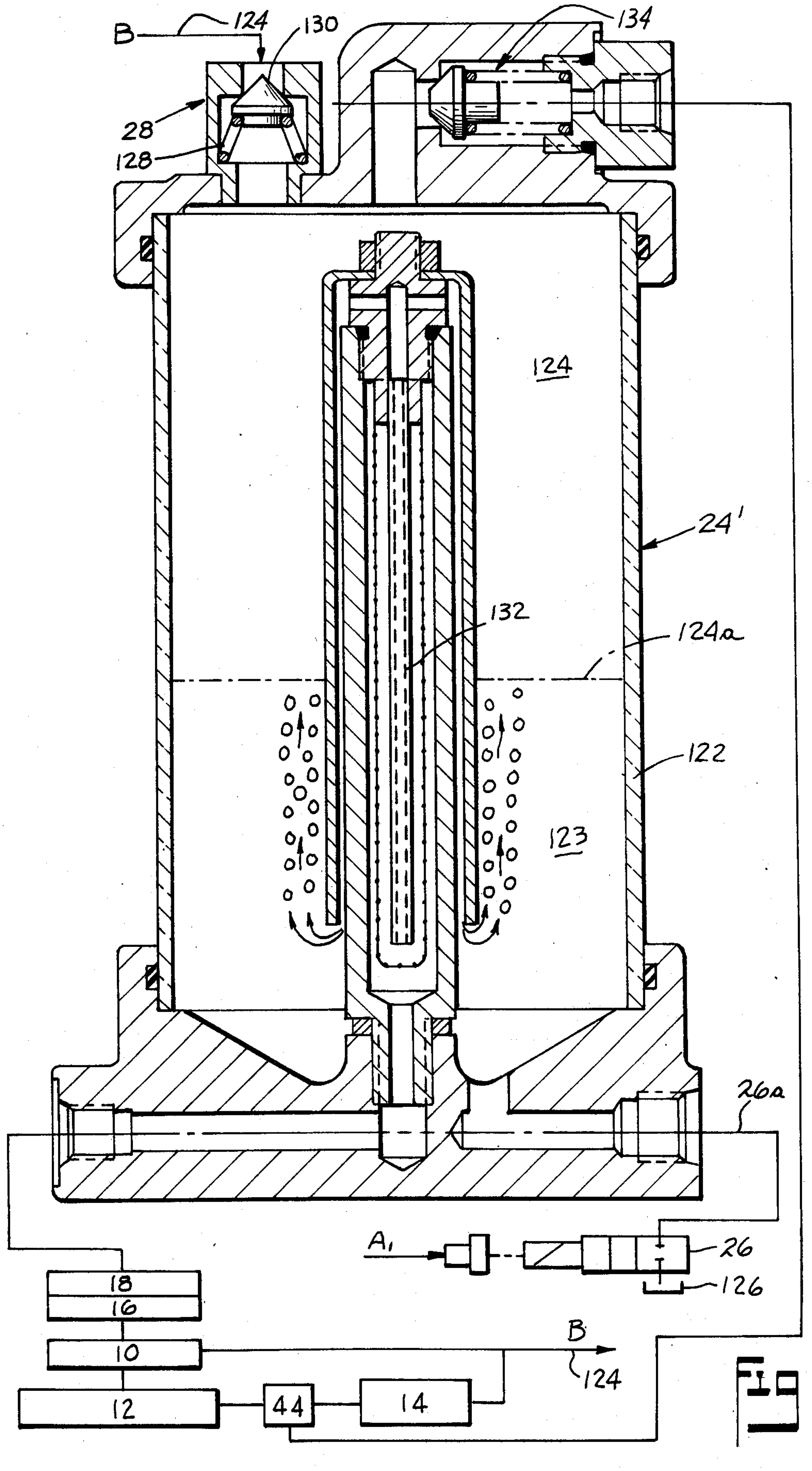
FIG. 2 is an enlarged sectional view through the gravity type separator illustrated in the FIG. 1 system, showing in detail the viscous resistance flow device of the gravity separator, together with an inverse relief valve at the upper end of the separator, for replenishing water evacuated from the gravity separator with oil from the pump of the system, the latter bieng shown schematically.

Referring now to FIG. 2 of the drawings, there is illustrated a gravity type separator generally designated by reference number 24' and which is generally similar to the gravity separator of FIG. 2 of aforementioned U.S. Pat. No. 4,534,860 wherein the specific features and operation are fully described in the specification thereof, which disclosure in U.S. Pat. No. 4,534,860 is incorporated herein by reference.

There is however some difference between the gravity separator 24' of FIG. 2 of this present application and that of the disclosure of U.S. Pat. No. 4,534,860, in that in the present gravity separator, there is provided an oil replenishing circuit which includes the aforementioned inverse relief valve 28.

When the water unloading circuit including the aforementioned solenoid valve 26 is activated in response to an applied control signal A1 (e.g. a manual, push button control), the valve 26 will evacuate accumulated water from the interior of the separator housing 122. The displaced water from space 123 in the separator housing 122 is replenished in the upper space 124 of the separator above the meniscus **124*a* through the inverse relief valve assembly 28 and from circuit B (schematically shown) which is directly connected by means of flow line 124 to the inlet port 35 of the centrifugal separator 10, and to the output port of the pump 14** of the system.

By opening the space 123 of the separator to the system water reservoir 126, due to the resistance of the flow control valve 18, the pressure within the gravity separator 24' drops to a level at which the pressure differential between the pressure in the circuit B and the pressure in space 124 of the separator will be sufficient to overcome the preload of the spring 128 of the inverse relief valve 28, to permit activation of the poppet 130 thereof, and therefore directly connect the space 124 with the circuit B which in turn, as aforementioned, is connected to the output port 30 of the pump 14.

Accordingly, the water evacuated through the solenoid valve 26 will be automatically replaced by oil from the output port of pump 14, permitting very rapid evacuation of water from the separator 24'. In the configuration of gravity separator disclosed in U.S. Pat. No. 4,534,860, the evacuated water has to be replenished through the relatively high resistance of the tube 132 of the gravity separator. Thus the pressure within the separator 24' is determined by the setting of the outlet pressure relief valve assembly 134, such assembly being the same as the outlet pressure relief valve assembly disclosed in the aforementioned U.S. Pat. No. 4,534,860.

Figure 3:
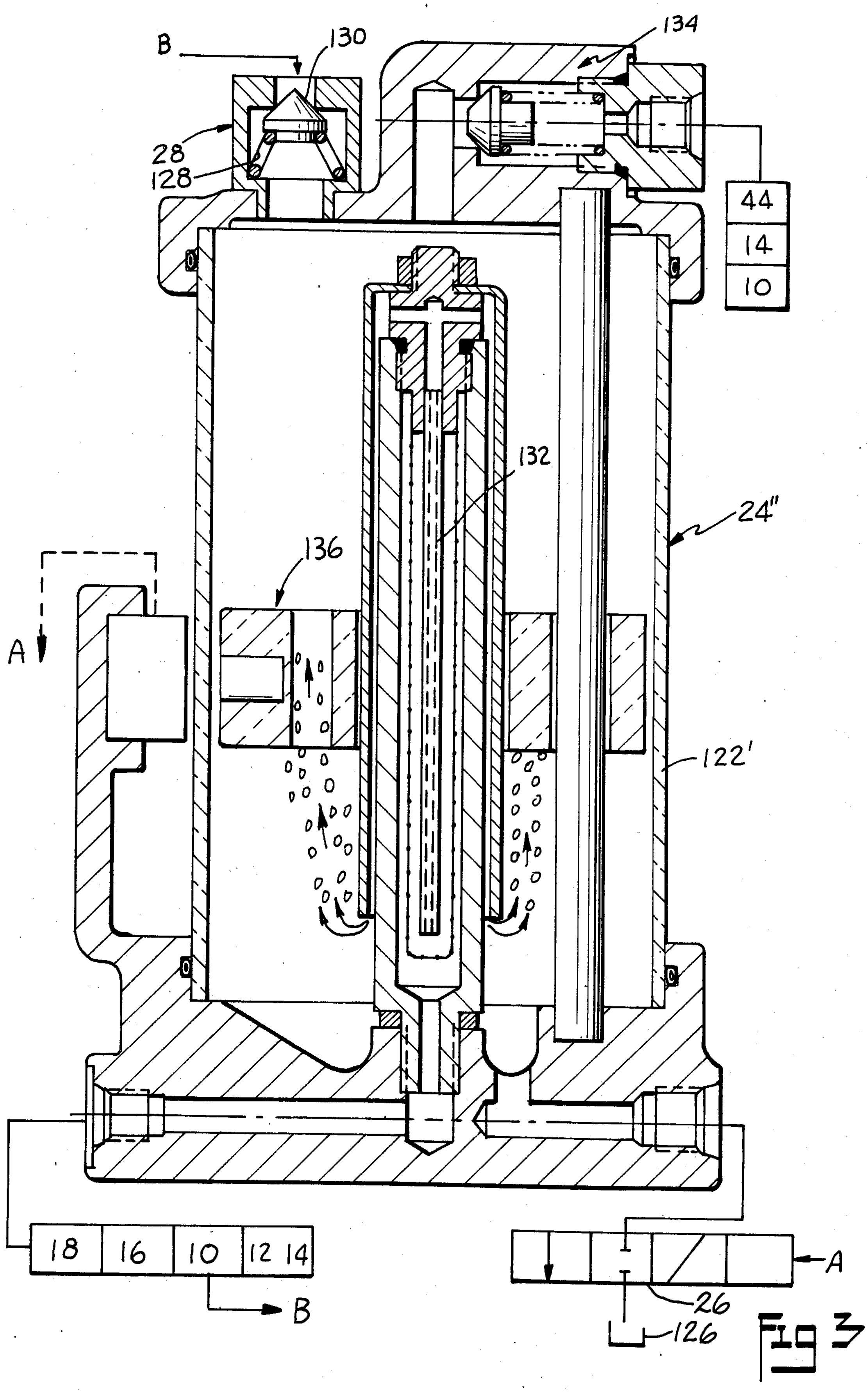
FIG. 3 is an enlarged vertical sectional view of another type of gravity separator for use with the system of FIG. 1, and which separator is provided with a float positioned by densities of the liquids which is automatically responsive to the water level in the gravity separator, for generating a signal to a solenoid valve for the gravity separator, for causing evacuation of the separated water from the gravity separator, such solenoid valve component and other components of the FIG. 3 embodiment being shown schematically.

Referring now to FIG. 3, there is shown a further modification 24'' of gravity separator useable in this system, with such separator being provided with an automatic water level control 136 which is generally similar to that disclosed in the aforementioned pending U.S. patent application Ser. No. 746,132 (now U.S. Pat. No. 4,591,433) which is incorporated herein by reference for a complete discussion of the structure and operation of such automatic water level control mechanism and circuit.

In this embodiment of pressurized gravity type separator 24'' there is provided an inverse relief valve assembly 28 at the upper end of the separator housing generally similar to that aforedescribed in conjunction with the FIG. 2 embodiment, with such relief valve assembly being connected to circuit B and being adapted for replenishment of the evacuated water from the gravity separator by means of oil from the output port of the pump 14, in a similar manner as aforedescribed in connection with FIG. 2, thus replacing the evacuated water from the gravity separator with oil from the oil pressure circuit.

In this embodiment, the solenoid valve 26 for evacuating the water from the separator housing 122' is made responsive to a control signal A generated from the water level control 136 of the gravity separator; and as aforementioned, reference made be had to pending U.S. patent application Ser. No. 746,132 (now U.S. Pat. No. 4,591,433 for a more complete disclosure and discussion of the operation of such water level control and the associated solenoid valve 26 control.

However, it will be seen that such arrangement provides a means for activating the water evacuating system of the gravity separator for causing evacuation of separated water in the separator housing, automatically, via a signal from the water level control in the housing 122'.

From the foregoing description and accompanying drawings, it will be seen that the invention provides a novel centrifugal filter separating system comprising a centrifugal type separator having a centrifuged water exit port and an inlet port adapted to be supplied with pressurized oil and water by a pump in the system, and including sensing means coacting with the water exit port, operable to detect the presence of centrifuged water at the inner surface of the rotating drum of the centrifugal separator, and flow control means coacting with the sensing means and operative to control the flow of liquid from the vicinity of the inner surface of the rotating drum to the water exit port, with such control means including means responsive to the sensing means operable to induce flow through the water removal circuit as long as a layer of water exists against the inner surface of the rotating drum due to centrifugal force; and with no water present at the inner surface of the rotating drum, the water detecting sensor control isolates the flow control from the water extracting circuit of the centrifugal separator, but does maintain a constant priming leakage at a minimum level through a leakage orifice, for purposes of priming the water removal circuit of the centrifugal separator.

The invention also provides a system of the aforementioned type which includes a gravity separator means coupled to the flow control means in the system downstream therefrom, and where the gravity separator includes means for replenishing rapidly in the gravity separator, water evacuated from the separator by the separator water evacuating means, with oil.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a centrifugal filter separator system comprising a centrifugal type separator having a relatively stationary housing with an inlet port adapted to be supplied with pressurized oil and water by a pump having a suction port connected to reservoir, a clean oil outlet port connected to said reservoir, and a centrifuged water port, said centrifugal type separator including a rotatable drum having an inner surface, liquid disposed in said drum being adapted to be subjected to high centrifugal force upon rotation of said drum responsive to activation of said pump whereby the liquid will be disposed on said inner surface of said drum, said drum being journaled in said housing and functionally interconnected with said inlet port, liquid conducting means in said drum operable for interconnecting with said centrifuged water port for liquid flow, liquid at said inner surface of said drum, sensing means coacting with said water port and operable to detect the presence of centrifuged water at said inner surface, and flow control means coacting with said sensing means and operative to control the flow of liquid from the vicinity of said inner surface to said water port, said control means including means responsive to said sensing means operable to induce flow through said liquid conducting means during rotation of said drum as long as water is maintained against said inner surface by centrifugal force during such rotation.

2. A centrifugal filter separator system in accordance with claim 1 wherein said sensing means includes means responsive to pressure differential between the pressure at said inlet port and pressure at said water port during operation of said system.

3. A centrifugal filter separator system in accordance with claim 1 wherein said flow control means includes maximum flow limiting means operable to limit pressure differential induced by resistance to the flow of liquid through said liquid conducting means during operation of said system.

4. A centrifugal filter separator system in accordance with claim 1 wherein said flow control means includes flow resistance means downstream of said sensing means and liquid throttling means operable to maintain by liquid throttling a relatively constant low pressure differential across said flow resistance means.

5. A centrifugal filter separator system in accordance with claim 4 wherein said flow resistance means comprises liquid viscosity sensitive means.

6. A centrifugal filter separator system in accordance with claim 1 wherein said flow control means includes leakage means upstream of said sensing means and liquid throttling means operable to maintain by liquid throttling a relatively constant low pressure differential across said leakage means.

7. A centrifugal filter separator system in accordance with claim 6 wherein said leakage means comprises liquid viscosity sensitive means.

8. A centrifugal filter separator system in accordance with claim 6 including liquid conducting means coacting with said flow control means operable to conduct liquid passing through said leakage means of said flow control means to said suction port of said pump.

9. A centrifugal filter separator system in accordance with claim 1 including separator means coupled to said flow control means downstream of said flow control means.

10. A centrifugal filter separator system in accordance with claim 9 wherein said separator means has liquid conducting means connected thereto operable to conduct separated oil in said separator means to said suction port of said pump.

11. A centrifugal filter separator system in accordance with claim 9 wherein said separator means includes means for accomplishing separation of oil from water, means to retain separated water and oil, and means to conduct separated oil from said separator means to said suction port of said pump.

12. A centrifugal filter, separator system in accordance with claim 11 wherein said separator means includes evacuating means operable to evacuate separated water in said separator means from said retaining means, and replenishing means adapted to replenish in said separator means the water evacuated by said evacuating means with oil from the pressure port of said pump.

13. A centrifugal filter separator system in accordance with claim 12 wherein said replenishing means includes an inverse relief valve mounted on the upper end of said separator means and coupled by conduit to said pressure port of said pump.

14. A centrifugal filter separator system in accordance with claim 12 wherein said evacuating means includes solenoid operated valve means, and means for activating the last mentioned valve means to cause evacuation of separated water from said retaining means.

15. A centrifugal filter separator system in accordance with claim 14 wherein said means for activating said solenoid valve means includes means automatically responsive to the water level in said separator means and means coacting with said water level responsive means for generating a signal to said solenoid valve means for activation of the latter.

* * * * *